Aug. 5, 1947.  T. S. KULKA  2,425,100
FILM PROTECTOR
Filed April 17, 1944

INVENTOR.
THOMAS S. KULKA
BY
Oberlin, Limbach & Day.
ATTORNEYS

Patented Aug. 5, 1947

2,425,100

UNITED STATES PATENT OFFICE 2,425,100

FILM PROTECTOR

Thomas S. Kulka, Cleveland, Ohio

Application April 17, 1944, Serial No. 531,521.

2 Claims. (Cl. 206—53)

The present invention relates to a device for protecting motion picture film against damage, injury and breakage, particularly when such film is being stored, handled or transported in the form of a coil or a reel. Motion picture film is wound upon a metal reel, usually termed an "exchange reel" in the trade, for the purpose of handling and transporting the film before and after its use in a motion picture film projector. Such reels are fabricated of sheet metal and have radial flanges which are spaced apart a distance slightly greater than the width of the film. Quite frequently, and regardless of the amount of caution exercised by the operator, some convolutions of film project outwardly from the sides of the coil, and as the reel is picked up or handled, the metal flanges thereof are forced inwardly against such projecting edges of film, thereby damaging or breaking the film in that particular portion.

The general object and nature of my invention is to provide a protecting device for preventing the above-mentioned damage and breakage to laterally projecting convolutions of the film by the inward bending of the reel flanges.

It is also an object of my invention to incorporate into my protecting device the additional function of means for retaining the film in its coiled or wound position upon the reel.

Still another object of my invention is to provide relatively simple and efficient fastening means for gripping together the overlapped ends of my film protector band.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
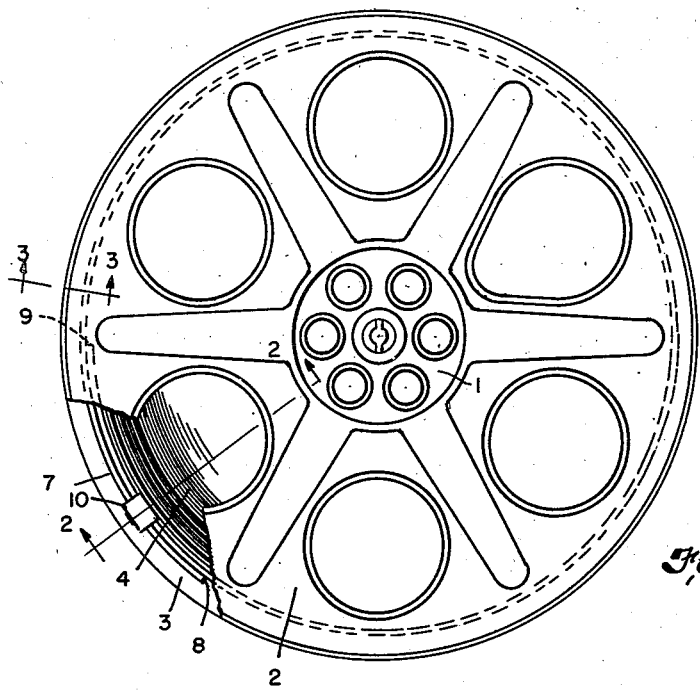
Fig. 1 is a plan view, with a portion broken away, of a motion picture exchange reel, showing the coil of film and the film protecting band of my invention assembled thereon.
Figure 2:
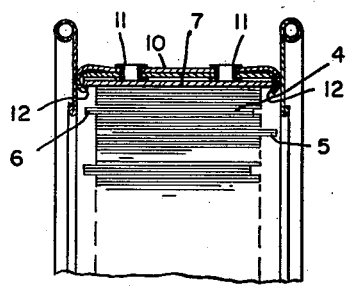
Fig. 2 is an enlarged sectional view taken upon a plane normal to that of Fig. 1 and substantially along line 2—2 thereof.

Now referring more particularly to the drawing, there is shown therein a reel, fabricated from sheet metal or the like having a hub 1 carrying the radial flanges 2 and 3. A coil of motion picture film 4 is wrapped on the reel about the hub 1. Certain of the convolutions of the coil of film 4 project laterally into the space between the inside faces of the flanges 2 and 3. Such lateral projections are indicated at 5 and 6 in Fig. 2. Normally, and without the benefit of my invention, when the reel is picked up by an operator, the flanges 2 and 3 would be bent inwardly toward each other, thus pressing against the film edge projections 5 and 6 and either damaging or fracturing the film in such portions, requiring subsequent cutting away of these portions and a resplicing of the film before it can be used. The likelihood of such damage becomes greater as the film itself becomes older and hence more brittle and subject to age hardening.

In order to prevent the flanges 2 and 3 of the reel from being bent inwardly against the projecting edges 5 and 6 of the film convolutions, I provide a longitudinally flexible band 7 which is of a length sufficient to circumvent the outer convolution of the film coil 4. The band 7 is of sufficient thickness to be laterally rigid and to withstand the compressive force that would be exerted either by the grasp of an operator when picking up the reel or by the pressure that would be exerted upon the flanges when two or more reels would be stacked one upon the other. Preferably, the band 7 is fabricated from a plastic material, such as cellulose acetate, cellulose butyrate, polystyrene, ethyl cellulose, or a like thermosetting resin material which lends itself quite suitably to manufacture by the extrusion process, so that the band may be made to accurate specifications at a relatively economical cost.

Figure 3:
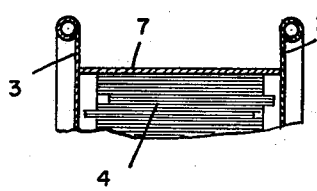
Fig. 3 is a similar sectional view taken along line 3—3 of Fig. 1.

The band 7, as best indicated in Fig. 3, has a width equal to the distance between the flanges 2 and 3 when they are in their normal and undistorted position, viz., equal to the distance between said flanges at a point adjacent the hub 1. This width, in the case of a reel for 35 mm. width motion picture film, is 40 mm., thus providing a nominal clearance space of 2½ mm. on each side of the film coil 4.

Figure 4:
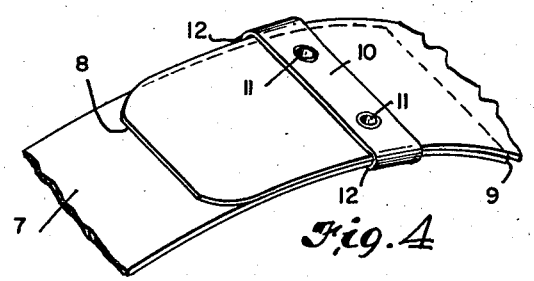
Fig. 4 is a perspective view showing the fastener for the overlapped ends of the film protecting band.

The end 8 of the band 7 overlaps the other end 9, and as best illustrated in Fig. 4, is fastened thereto by means of a transverse strip 10, either of metal or plastic material, which is secured to the outer end 8 by suitable fastening means, such as the rivets 11. The outer ends of the strip 10 are hooked or reversely bent, as indicated at 12 and extend slightly beyond the edges of the band 7, so that when the outer end 8 of the band is pushed down on the inner end 9, the hooked ends 12 first tend to bend upwardly until their terminal ends are forced apart a distance equal to the width of the band 7, and then snapped down over the inner edge of the inner band end 9, thus effecting a gripping action between the overlapping ends of the band 7. When the last-described fastening means are sought to be released, it is merely necessary for the operator to lift up on the outer end 8 of the band 7, whereby the resilient, hooked ends 12 of the strip 8 are pulled away from the opposing portion of the band 7.

It will thus be seen that my above-described invention provides not only a simple and efficient means for protecting the motion picture film against damage when wound upon a reel, but also, in combination with the reel, a very convenient means for retaining the film coil on the reel and thus constituting a motion picture film packaging device for handling, transporting and storing.

Other modes of applying the principle of the invention may be employed, change being made as regards the details described, provided the features stated in any of the following claims or the equivalent of such be employed.

I therefore particularly point out and distinctly claim as my invention:

1. A protector for motion picture film wound on a reel, comprising a longitudinally flexible and transversely rigid band of plastic material having a width adapted to bridge the space between the reel flanges and having a length sufficient to wrap around the outside of the coil of film with end portions of said band in overlapping relationship, a strip of resilient material transversely fastened to one end of said band and reversely bent ends on said strip adapted to snap over and engage the lateral edges of the overlapped end portion of said band, said reversely bent ends being normally spaced apart a distance slightly smaller than the width of said band and movable away from each other a distance greater than the width of said band through lengthwise flexing of said strip, whereby said fastening means is operable to engaged and disengaged positions by movement thereof in a radial direction only with respect to said reel.

2. A device for handling and packaging motion picture film, comprising the combination of a reel having a hub and spaced flanges attached thereto, said flanges being bendable toward each other, a coil of film wound on said reel between said flanges, a longitudinally flexible and transversely rigid band of plastic material, such as cellulose acetate or the like, wrapped on the outermost convolution of said coil of film with its end portions in overlapping relationship, said band having a width equal to the space between said flanges at their point of attachment to said hub, a strip of resilient material transversely fastened to one end of said band and reversely bent ends on said strip adapted to snap over and engage the lateral edges of the overlapped portion of said band, said reversely bent ends being normally spaced apart a distance slightly smaller than the width of said band and movable away from each other a distance greater than the width of said band through lengthwise flexing of said strip, whereby said fastening means is operable to engaged and disengaged positions by movement thereof in a radial direction only with respect to said reel.

THOMAS S. KULKA.

REFERENCES CITED

The following references are of record in the file of this patent:

UNITED STATES PATENTS

| Number | Name | Date |
|---|---|---|
| 1,319,552 | Wolfermann et al. | Oct. 21, 1919 |
| 2,172,675 | Goldberg | Sept. 12, 1939 |
| 1,468,636 | Hoeft | Sept. 25, 1923 |
| 2,353,385 | Briggs | July 11, 1944 |

FOREIGN PATENTS

| Number | Country | Date |
|---|---|---|
| 748,331 | France | Apr. 10, 1933 |